July 18, 1933.  I. B. WINSOR  1,918,364

SOLENOID MOTOR

Filed Oct. 6, 1930  2 Sheets-Sheet 1

INVENTOR
*Irwin B. Winsor*
BY *Arthur C. Brown*
ATTORNEY

July 18, 1933.  I. B. WINSOR  1,918,364
SOLENOID MOTOR
Filed Oct. 6, 1930   2 Sheets-Sheet 2
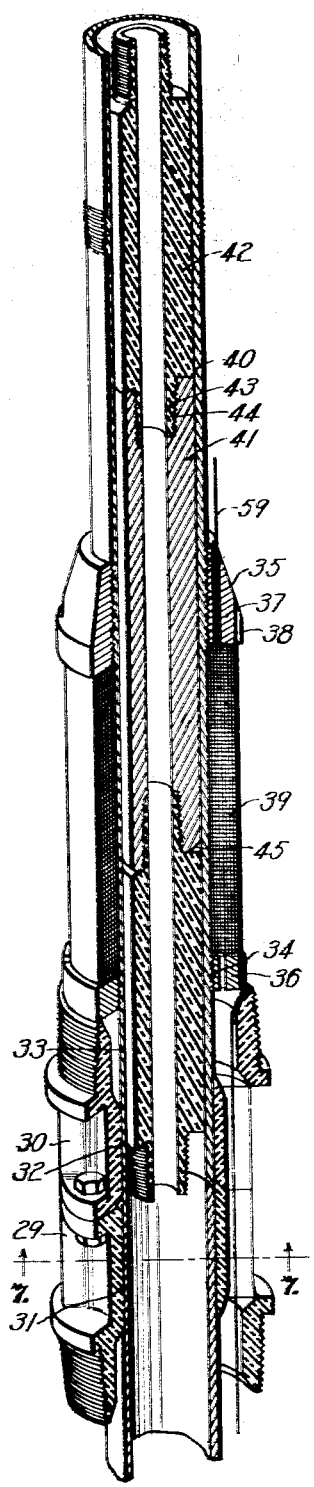
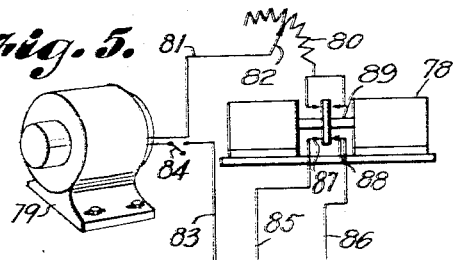
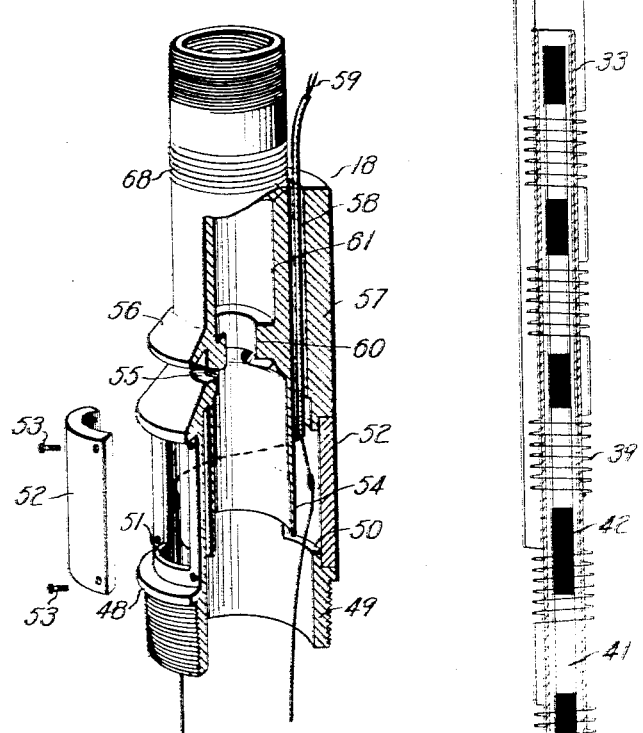
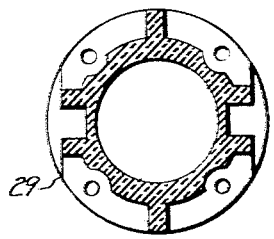
INVENTOR
*Irwin B. Winsor*
BY *Arthur C. Brown*
ATTORNEY Patented July 18, 1933

1,918,364

UNITED STATES PATENT OFFICE

IRWIN B. WINSOR, OF TULSA, OKLAHOMA

SOLENOID MOTOR

Application filed October 6, 1930. Serial No. 486,694.

My invention relates to magnetic motors and more particularly to motors of that character especially adapted for pumping oil wells, the principal object of my invention being to provide a motor having a greater lifting capacity in proportion to its current consumption than similar apparatus heretofore provided.

Other important objects of the invention are to provide a novel head for the motor for preventing entrance of liquid, under the high pressure at the bottom of a well, into the windings of the motor; to embody means for accurately limiting the up-and-down movement of the plunger in order to effect a proper positioning of the plunger relative to the coils for obtaining maximum efficiency; and to embody shock-absorbing means for the plunger.

In accomplishing these and other objects of my invention I have provided improved details of structure the preferred form of which is illustrated in the accompanying drawings, wherein:

Fig. 4 is a perspective view, partly in section, of a core tube, a core mounted therein and a coupling and coil member mounted thereon.

Fig. 5 is a diagrammatical view of the coil windings connected in circuit with current supply and control mechanism.

Fig. 6 is a perspective view, partly in section, of a head for the motor, a door being shown in disassembled relation with the head.

Fig. 7 is a cross section of a coupling member on the line 7—7 Fig. 4.

Figure 1:
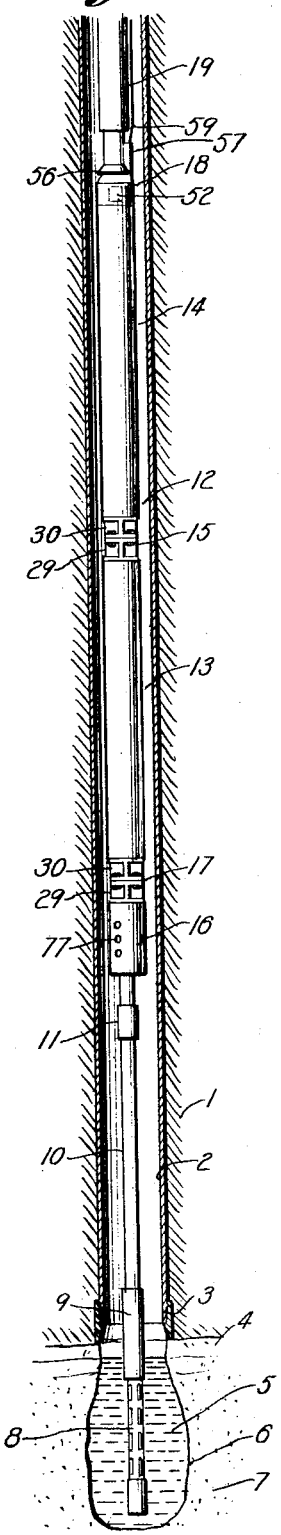
Fig. 1 is an elevational view of a magnetic motor in functional position in the lower end of an oil well shown in central section.

Referring more in detail to the drawings:

1 designates an oil well lined with casing 2 supported by a casing shoe 3 on cap rock 4 adjacent the lower end of the well. Extending into a body of oil 5 collected in a shot hole 6 in the oil sand 7 below the cap rock, is a strainer pipe 8 connected by a standing valve 9, working barrel 10 and coupling 11 to the lower end of a solenoid motor 12 embodying my invention and now to be described in detail.

The motor preferably comprises lower and upper coil units 13 and 14 connected by a coupling 15, a supporting element 16 secured to the upper end of the working barrel tube and connected by a coupling 17 to the lower end of the unit 13, and a head 18 joining the upper coil unit to the string of well tubing 19 leading to the top of the well. It is particularly necessary that the coupling 15 be formed of a good grade of bronze or similar metal to magnetically insulate the coil units.

Each coil unit includes a cylindrical solenoid jacket or barrel 20, the lower jacket being internally threaded at its lower and upper ends as indicated at 21 and 22 for respectively engaging the couplings 17 and 15, and the upper jacket 20 having internally threaded ends 23 and 24 for respectively engaging the coupling 15 and the head 18.

Formed in the jacket of the lower unit, adjacent its lower end, is an internal flange 25 conical in cross section to increase the pulling capacity of the motor and defining a cylindrical opening 26 aligning with a complementary guide opening 27 in a similar flange 28 provided adjacent the upper end of the coil unit 14.

The couplings 15 and 17, each comprising mating sections 29 and 30, are provided in like manner with aligning openings 31 and 32, so that a continuous core tube 33, preferably constructed of brass or other non-magnetic material and joined in the coupling 15, may be extended throughout the solenoid jackets.

The outer surface of the core tube is reduced in diameter to form pairs of annular bosses 34 and 35 equally spaced on the tube and threaded for receiving lower and upper coil heads 36 and 37, thereby producing spools for the coil windings of the motor.

Figure 2:
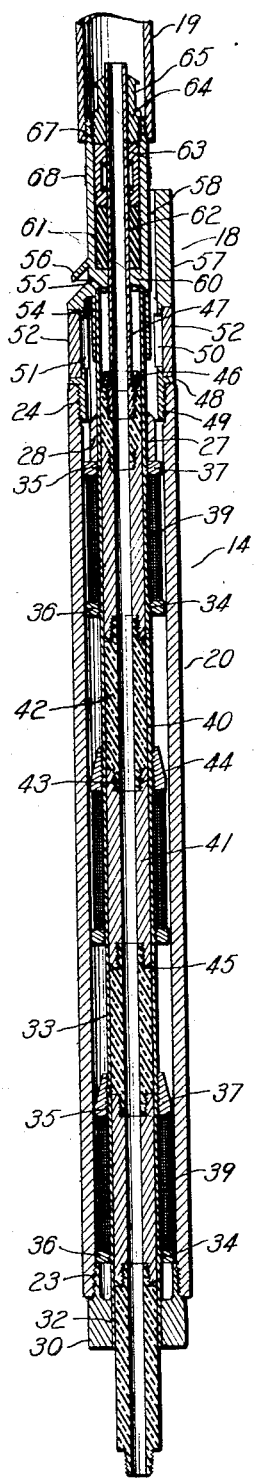
Fig. 2 is a central vertical section of the upper end of a magnetic motor embodying my invention.
Figure 3:
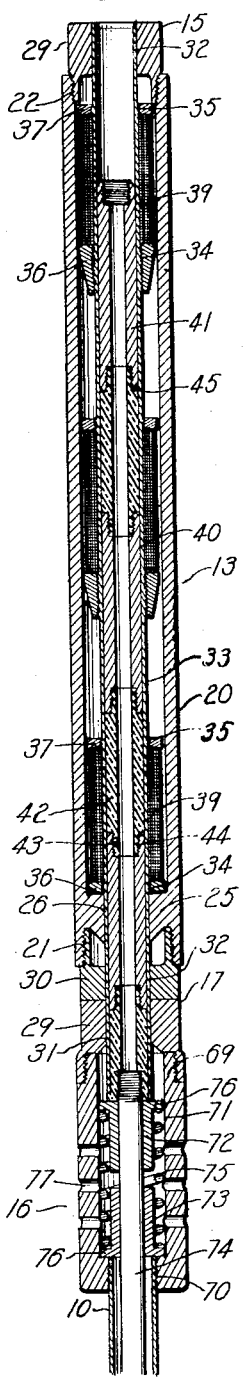
Fig. 3 is a central sectional view of the lower end of the motor.

As shown in Fig. 2, the upper heads of the two lower spools in the coil unit 14 are chamfered to increase the magnetic pull of the solenoids, and the lower heads of the two upper spools in unit 13 are likewise chamfered as shown in Fig. 3.

Each of the coil heads and also the flange 28 in the upper coil unit are provided with diametrically opposed ports and slots 38 to serve as passages for wire strands connecting the windings 39 on the spools.

The manner of winding the spools is particularly illustrated in Fig. 5 from which it will be readily apparent that the sets of upper and lower coils are each wound in series. In winding the coils on the spools a plurality of layers of insulating paper with a layer of insulating cloth between successive layers of paper are preferably wound on the core tube between the coil heads. Successive layers of magnet wire are then wound over the insulation and each layer of wire is treated with a good grade of varnish. After the coils have been wound and surrounded with additional insulating cloth the unit is baked to prevent moisture from penetrating the windings.

Slidably mounted within the core tube is a continuous core or plunger 40 formed of alternate steel and bronze sections 41 and 42, the bronze sections having reduced, externally threaded necks 43 on each end for engaging the internally threaded sockets 44 formed in the ends of the steel sections. Attention is further directed to the fact that one end of the steel section is chamfered, as indicated at 45, for the purpose of increasing the magnetic pull of the motor.

The upper end of the plunger is connected by a coupling 46 to the lower end of a hollow rod 47 leading to a point above the upper end of the pump head 18.

The pump head preferably comprises a cylindrical body 48 having an externally threaded lower neck 49 for engaging the upper end of the pump jacket, and is further provided with opposite openings 50 and 51, normally closed by doors 52 secured to the cylindrical body by screws or the like 53.

A concentric shield 54 formed integrally with the head extends downwardly therein to direct flow of liquid from the well through ports 55 formed in the head immediately above the shield to permit escape of liquid bypassing the plunger and collecting in the upper end of the core tube. An outer skirt 56 provided on the head above said port serves to prevent foreign particles from lodging in said openings to obstruct flow of fluid therethrough.

Provided on one side of the head is a longitudinal boss 57 having an opening 58 for receiving wires 59 leading from a source of electrical energy, as later described, and extending downwardly through the head for connection with the wires of the solenoids when the doors of the head have been removed.

The inner channel of the head is constricted by an inwardly extending flange 60, thus forming a socket 61 adapted to seat packing material 62 for engaging the hollow rod 47 to prevent escape of fluid around the rod.

Means for urging the packing material downwardly in the socket includes a sealing collar 63 engaged on its upper end by a gland 64 threaded into the upper end of the head and having a reduced portion 65 for the application of a suitable tool used for threading the gland into or out of the head.

The tubing 19, as is commonly employed in pumping oil wells is threaded, as indicated at 67, on the externally threaded upper end of the head, and removal of the motor from a well is facilitated through the provision of a series of circumferential teeth 68 formed on the head near its upper end.

When the coils of the motor are not energized the plunger rests on the supporting element 16 which includes a cylindrical housing having a reduced externally threaded neck 69 for engaging the internally threaded end of the coupling section 29, and having a lower constricted opening 70 for receiving the working barrel tube 10.

Slidably mounted in a concentric socket 71, formed in the supporter housing, are opposed guides 72 and 73 for receiving a plunger tube 74 connected at its lower end to the pump plunger and at its upper end to the core 40, and an expansion spring 75, seated in the socket, bears against outwardly directed flanges 76 of the guides to normally space the inner ends of the guides. Transverse ports 77 provided in the supporter housing serve to permit discharge of liquid bypassing the plunger and collecting in the socket 71.

While the element 16 supports the plunger when the pump is not in operation, it is not intended to limit the downward travel of the plunger when the coils are energized, as pounding of the plunger on the supporter would be detrimental to the pump.

The limit of reciprocating movement of the magnetic core or plunger 40, when in operation, is determined by the length of the central section dividing the plunger into upper and lower portions. It is possible only by experimentation to accurately ascertain the proper length of this section necessary to produce the desired cushioning effect at each end of the plunger stroke and to properly position the core relative to the coils for maximum efficiency of the motor.

Apparatus for supplying electrical energy and controlling flow thereof to the solenoid windings preferably includes a circuit breaker 78 of the reciprocating type, a generator 79 and a rheostat 80. A wire 81 leading from the generator connects to a movable arm 82 of the rheostat and another lead 83 from the generator is grounded on the core tube 33 and provided with a switch 84. The rheostat in turn is respectively connected by branches 85 and 86 to the lower and upper groups of coils, which are each preferably connected in series, and the branches are provided with switches 87 and 88 respectively, adapted to be alternately opened and closed by a reciprocable armature 89 of the circuit breaker.

In apparatus constructed and assembled as described the plunger will normally rest at its lower limit of travel as shown in Figs. 2 and 3. When in this position the switch 84 may be closed and upon closure of the switch 87 current is supplied from the generator to the lower group of solenoid windings.

As is clearly disclosed in Fig. 5 the upper ends of the iron sections in the unit 13 are positioned slightly below the center of the windings when in lowered position, and upon energization of the coils the plunger is immediately drawn upwardly into the unit until the lower ends of the iron sections in the upper unit reach a point slightly above the center of the upper solenoids.

Through action of the circuit breaker the current to the lower series of coils is broken and the circuit to the upper series of coils is closed thereby drawing the plunger downwardly to its former position.

Oil is thus pumped through the usual standing and working valves and is drawn upwardly through the hollow plunger and into the tubing to be discharged from the well and led to storage as in usual practice.

In passing through the hollow core or plunger the fluid carries away the excessive heat generated by the coils, thereby maintaining a temperature of the coils equal to that of the fluid in the well.

As a result of the method of spacing the respective series of core sections relative to their complementary series of solenoids a magnetic cushioning effect is produced at each end of the stroke of the core plunger, thus insuring smooth and efficient operation of the motor.

What I claim and desire to secure by Letters Patent is:

1. A motor of the character described including a housing, a core tube extending concentrically through said housing, an electric circuit including coil units wound in spaced relation on said tube and current-supply lines leading to said units, a core unit reciprocable in said tube and responsive to energization of the coil units, and a head on said housing having transverse openings and removable plates adapted for closing said openings to permit connection of the supply lines with the coil windings.

2. A motor of the character described including a housing, a core tube extending longitudinally through said housing, coil units wound in spaced relation on said tube, a core unit reciprocable in said tube and responsive to energization of the coil units, a head on said housing having transverse openings and removable plates adapted to close said openings, and a concentric shield extending downwardly in said head and spaced from said openings.

3. A motor of the character described including a housing, a core tube extending concentrically through said housing, pairs of coil heads fixed on said tube to form spools, coils wound on said spools, one head of each pair being chamfered to increase the magnetic pull of the coils, and a core unit comprising magnetically insulated sections slidably mounted in said tube and adapted to be reciprocated upon energization of said coils.

4. A motor of the character described including a housing, a core tube extending longitudinally through said housing, coil units wound in spaced relation on said tube, a core unit reciprocable in said tube and responsive to energization of the coil units, and a head on said housing having a relief port to permit escape of liquid collecting within the core tube above the core unit upon upward movement of the core unit.

5. A motor of the character described including a housing, a core tube extending longitudinally through said housing, coil units wound in spaced relation on said tube, a core unit reciprocable in said tube and responsive to energization of the coil units, a head on said housing having relief ports to permit escape of liquid collecting within the core tube above the core unit upon upward movement of the core unit, and a supporting element on the lower end of the housing having relief ports to permit escape of liquid collecting in said element.

6. A motor of the character described for pumping well fluid through well tubing including a housing and sets of axially aligning solenoids in the housing, a hollow core unit through which said fluid is adapted to be pumped comprising separate insulated sections adapted to be reciprocated upon energization of said solenoids, a plunger tube connected to the lower end of the unit and communicating with said hollow core, a head connecting the upper end of the housing to the well tubing, and packing means seated in said head and sealingly engaging the upper end of the core unit.

IRWIN B. WINSOR.